United States Patent
Adamsson et al.

(10) Patent No.: US 10,847,863 B2
(45) Date of Patent: Nov. 24, 2020

(54) METHOD AND A SYSTEM FOR EVALUATING A FILTER BODY AND A METHOD FOR MANUFACTURING A CAVITY FILTER

(71) Applicant: SYNTRONIC AB, Gävle (SE)

(72) Inventors: Peter Adamsson, Gävle (SE); Lars Holmlund, Gävle (SE)

(73) Assignee: Syntronic AB, Gävle (SE)

(*) Notice: Subject to any disclaimer, the term of this patent is extended or adjusted under 35 U.S.C. 154(b) by 0 days.

(21) Appl. No.: 16/308,957

(22) PCT Filed: Jun. 21, 2017

(86) PCT No.: PCT/SE2017/050685
§ 371 (c)(1),
(2) Date: Dec. 11, 2018

(87) PCT Pub. No.: WO2017/222463
PCT Pub. Date: Dec. 28, 2017

(65) Prior Publication Data
US 2019/0165441 A1    May 30, 2019

(30) Foreign Application Priority Data
Jun. 22, 2016  (SE) ...................... 1650899

(51) Int. Cl.
*H01P 11/00* (2006.01)
*H01P 1/205* (2006.01)
(Continued)

(52) U.S. Cl.
CPC ............ *H01P 11/007* (2013.01); *G01B 11/24* (2013.01); *H01P 1/208* (2013.01); *H01P 1/2053* (2013.01)

(58) Field of Classification Search
CPC ...... H01P 1/2053; H01P 1/208; H01P 11/007; G01B 11/24
(Continued)

(56) References Cited

U.S. PATENT DOCUMENTS 5,198,788 A * 3/1993 Phillips ................. H01P 1/2056
333/207
9,163,936 B1  10/2015 Ulmer et al.
(Continued)

FOREIGN PATENT DOCUMENTS

| CA | 2638919 A1 | 2/2009 |
| EP | 1321997 A2 | 6/2003 |
| WO | 2008008006 A1 | 1/2008 |

OTHER PUBLICATIONS

Mansour, "Filter Technologies for Wireless Base Stations," IEEE Microwave Magazine, 5(1), Mar. 2004, pp. 68-76.

*Primary Examiner* — Benny T Lee
*Assistant Examiner* — Hafizur Rahman
(74) *Attorney, Agent, or Firm* — Dilworth & Barrese, LLP

(57) ABSTRACT

A method and a system (13) for evaluating a lower filter part (2) of a cavity filter including a bottom plate from which wall portions and at least one resonating element extend in an upward direction, wherein the method comprises: —scanning the lower filter part using a laser scanning assembly (14) to collect data relating to shapes and dimensions of the lower filter part, —comparing the collected data with reference data to determine whether the lower filter part fulfils predetermined quality requirements. A method for manufacturing a cavity filter includes evaluating a filter body of the lower filter part prior to assembling the cavity filter, wherein the step of assembling the cavity filter is only carried out if the filter body fulfils the predetermined quality requirements.

8 Claims, 3 Drawing Sheets

(51) Int. Cl.
*H01P 1/208* (2006.01)
*G01B 11/24* (2006.01)

(58) Field of Classification Search
USPC .................................................. 333/206, 203
See application file for complete search history.

(56) References Cited

U.S. PATENT DOCUMENTS

| | | | |
|---|---|---|---|
| 2003/0048148 A1* | 3/2003 | Humphreys | H01P 7/082 |
| | | | 333/99 S |
| 2005/0136876 A1* | 6/2005 | Broholm | H01P 1/2053 |
| | | | 455/307 |
| 2008/0007371 A1 | 1/2008 | Rottmoser et al. | |
| 2008/0157899 A1 | 7/2008 | Weitzenberger | |
| 2009/0302974 A1* | 12/2009 | Lyons | C08J 9/0066 |
| | | | 333/203 |
| 2015/0276393 A1* | 10/2015 | Nishikawa | G05B 19/4097 |
| | | | 29/888.06 |

* cited by examiner

METHOD AND A SYSTEM FOR EVALUATING A FILTER BODY AND A METHOD FOR MANUFACTURING A CAVITY FILTER

TECHNICAL FIELD OF THE INVENTION

The present invention relates to a method for evaluating a lower filter part of a cavity filter, a method for manufacturing a cavity filter and a system for evaluating a lower filter part of a cavity filter.

BACKGROUND AND PRIOR ART

Cavity filters are resonator filters that are commonly used in e.g. the field of telecommunications, and they are particularly useful when the transmitted signal power is relatively high. Cavity filters are widely used for frequencies of 40 MHz and above, such as in the microwave frequency range from 1 GHz up to approximately 40 GHz.

A cavity filter typically comprises a lower filter part having a bottom plate from which wall portions defining cavities and several resonating elements extend in an upward direction. It further comprises an upper filter part, i.e. a filter cover, and inner and outer filter components including tuning elements and coupling elements for adjusting the inductive and capacitive coupling between e.g. the resonating elements.

In the manufacturing of cavity filters, a filter body is typically processed from a filter body blank to obtain a filter body with a conductive surface and a bottom plate, from which wall portions and resonating elements extend. The filter body and the inner components, such as cross-coupling elements and capacitive coupling elements for adjusting the capacitive coupling between the resonating elements and an upper filter part, are assembled to form a lower filter part. The lower filter part, the upper filter part and the outer filter components, including tuning elements, are thereafter assembled such that a cavity filter is obtained. After assembly, the cavity filter is tuned using the tuning elements. The tuning process is however relatively time consuming, in particular for a complex cavity filter having several resonating elements and cross-couplings, and therefore presents a bottleneck during production. Typically, a complex filter has more than eight resonating elements and may take more than 40 minutes to manually fine-tune.

During fine-tuning by a tuning technician, a Vector Network Analyzer (VNA) is used. The VNA displays real time frequency domain sweeps. The tuning technician adjusts the frequency of the resonating elements and the couplings between the resonating elements iteratively to meet the filter specification.

A problem that commonly arises during the tuning process of cavity filters is that the manufactured cavity filter that is to be tuned does not fulfill the quality requirements according to a specified blueprint. Such a cavity filter cannot be tuned to full performance and therefore has to be discarded, which is costly both in terms of time, effort and material. In order to ensure that the filter bodies used in the cavity filters fulfil certain predetermined quality requirements, it is common to pick a sample from a batch of filter bodies and mechanically measure the dimensions of the sample. This is however rather time consuming and can therefore only be done for a limited number of samples.

SUMMARY OF THE INVENTION

It is an objective of the present invention to provide a solution to the above mentioned problem such that the risk of discovering assembled cavity filters that do not fulfill the prerequisites according to the blueprint, and thereby cannot be properly tuned, is reduced or eliminated.

This objective is according to a first aspect of the invention achieved by means of the initially defined method, comprising the steps:

scanning the lower filter part using a laser scanning assembly to collect data relating to shapes and dimensions of the lower filter part, comparing the collected data with reference data to determine whether the lower filter part fulfils predetermined quality requirements.

Thus, by scanning the lower filter part using a laser scanning assembly, the lower filter part is evaluated and verified against the blueprint before the cavity filter is assembled and the fine tuning of the cavity filter starts. This saves a lot of time and effort since it prevents tuning attempts on cavity filters not fulfilling the quality requirements. Laser scanning enables very accurate determinations of the shapes and dimensions of the lower filter part, such as of the resonating elements and external as well as internal wall portions. By comparison with reference data, it is possible to determine very accurately whether the predetermined quality requirements are fulfilled, or how much the lower filter part differs from these requirements and what modifications have to be carried out in order to reach the quality requirements.

Preferably, the lower filter part that is scanned is a filter body, i.e. a body formed in one piece including the bottom plate, the resonating elements and the wall portions. The lower filter part may also include the filter body and inner filter components mounted thereon, in which case the laser scanning is primarily used to evaluate whether the components are correctly mounted within a predefined tolerance limit.

The lower filter part includes a bottom plate from which wall portions and at least one resonating element extend. It is most common, but not necessary, that the resonating element has a longitudinal axis that extends in an upward direction perpendicular to the bottom plate. The resonating element may however also be differently oriented with respect to the bottom plate. For example, it may be oriented with a longitudinal axis extending in a lateral direction, parallel to the bottom plate.

The proposed method is very fast compared to known methods of evaluating a filter body, and can therefore be used to evaluate all manufactured filter bodies within a batch and not only a few samples. Typically, critical dimensions can be determined in only a couple of minutes.

The reference data used for comparison can be either data available from a CAD/CAM (computer-aided design and computer-aided manufacturing) data file, and/or stored data from a previous laser scanning of a "golden unit", i.e. a cavity filter fulfilling all quality requirements.

The laser scanning assembly can be configured to collect data based on e.g. triangulation, two-dimensional triangulation, or the confocal principle. Preferably, laser light reflected off the target, i.e. the lower filter part, is used for measurement and identification of features.

Measured laser data are preferably digitised to point cloud data before comparing collected data to reference data. This involves transforming all measured laser data to a common coordinate system, which facilitates the comparison to reference data.

According to one embodiment of this aspect of the invention, the step of comparing the collected data with reference data comprises identifying predefined shapes within the collected data and comparing collected data relating to dimensions associated with said shapes with corresponding reference data. Important features within the cavity filter, such as the resonating elements and topological features influencing coupling between the resonating elements can thus easily be identified and evaluated. This may reduce the total amount of data used for evaluation, since unimportant features can be disregarded in the comparison. Using the method, features can be recognised with an accuracy down to ±5 μm.

According to one embodiment of this aspect of the invention, the predetermined quality requirements are considered fulfilled if the collected data relating to dimensions associated with said predefined shapes do not deviate from the corresponding reference data by more than a predetermined threshold amount. This is an efficient way of determining whether the quality requirements are fulfilled.

According to one embodiment of this aspect of the invention, said predefined shapes are selected so that collected data relating to an outer dimension of the at least one resonating element are compared to corresponding reference data. The outer dimensions of the resonating elements are important for the function of the cavity filter and are therefore useful to evaluate.

According to one embodiment of this aspect of the invention, the lower filter part comprises at least two resonating elements and said predefined shapes are selected so that collected data relating to dimensions of topological features influencing coupling between the resonating elements are compared to corresponding reference data. Such topological features can be e.g. decoupling walls decreasing magnetic and/or electric coupling between electrically adjacent resonating elements, or features used in capacitive cross-coupling between resonating elements that are not electrically adjacent. Typically, the lower filter part comprises at least eight resonating elements and at least one cross-coupling element.

According to one embodiment of this aspect of the invention, the step of scanning the lower filter part is carried out using a blue laser. With a blue laser, i.e. a laser operating in a wavelength range of 360-480 nm, the amount of secondary reflections is reduced and less problems with noise are thereby experienced. In this way, no pre-treatment with soot or similar of the lower filter part to reduce reflections is needed. The precision of the measurement can be improved in comparison with e.g. red lasers.

According to one embodiment of this aspect of the invention, the laser scanning assembly comprises at least two laser sources. Typically, a two-dimensional triangulation technique with two laser beams expanded into strips of light can be used to accurately determine dimensions and shapes.

According to one embodiment of this aspect of the invention, the step of scanning the lower filter part using a laser scanning assembly comprises moving one of the lower filter part and the laser scanning assembly in three directions with respect to the other one of the lower filter part and the laser scanning assembly. The entire lower filter part can thereby easily be scanned.

According to another aspect of the present invention, the above mentioned objective is achieved by means of the initially defined method for manufacturing a cavity filter comprising the steps:
 providing a filter body blank,
 processing the filter body blank to obtain a filter body having a bottom plate from which wall portions and at least one resonating element extend,
 providing an upper filter part and inner and outer filter components,
 assembling the cavity filter by mounting the inner filter components and the upper filter part onto the filter body and thereafter mounting the outer filter components,
wherein the method further comprises the steps:
 prior to assembling the cavity filter, scanning the filter body using a laser scanning assembly to collect data relating to shapes and dimensions of the filter body,
 comparing the collected data with reference data to determine whether the filter body fulfils predetermined quality requirements,
wherein the step of assembling the cavity filter is only carried out if the filter body fulfils the predetermined quality requirements.

Thus, the proposed method of manufacturing uses the proposed method of evaluation according to any one of the above described embodiments to verify that the filter body fulfils predetermined quality requirements before proceeding to mount the inner filter components. In this way, assembling of cavity filters whose filter bodies will not enable correct tuning is avoided. Instead, filter bodies that do not fulfil the quality requirements can be adjusted by further machining. This enables an efficient manufacturing process suitable for high volume production of cavity filters, in particular since processing of the filter body and final assembly of the cavity filter often take place at different geographical locations. Unnecessary shipping of filter bodies not fulfilling the quality requirements can thereby be avoided.

According to one embodiment of this aspect of the invention, if the quality requirements are not fulfilled, processing of the filter body is continued, and the steps of scanning the filter body and comparing the collected data with reference data are subsequently repeated. This allows a non-perfect filter body to be adjusted before being used in a cavity filter.

According to one embodiment of this aspect of the invention, the step of providing a filter body blank is carried out by moulding the filter body blank. Moulding is a cost-efficient way of providing a filter body blank. Typically, the filter body blank can in this case be made from aluminium.

According to one embodiment of this aspect of the invention, the step of processing the filter body blank comprises machining the filter body blank and providing it with a conductive coating. The machining is preferably milling. The conductive coating can be provided before or after laser scanning of the filter body.

According to one embodiment of this aspect of the invention, the method further comprises the steps:
 prior to mounting the upper filter part, scanning the filter body with the inner filter components mounted thereon using a laser scanning assembly to verify that the inner filter components are correctly mounted,
wherein the step of assembling the upper filter part, the lower filter part and the outer filter components is only carried out if the inner filter components are found to be correctly mounted. In this embodiment, the proposed method for evaluating a lower filter part is thus used twice. This eliminates or reduces the risk of providing a lower filter part having incorrectly mounted inner filter components mounted thereto.

According to another aspect of the present invention, the above mentioned objective is achieved by means of the initially defined system for evaluating a lower filter part of a cavity filter, comprising:

a laser scanning assembly configured to scan the lower filter part to collect data relating to shapes and dimensions of the lower filter part, a processing unit configured to compare the collected data with reference data to determine whether the lower filter part fulfils predetermined quality requirements.

The system is thus configured to perform the proposed method for evaluating a lower filter part. Advantages and advantageous features of such a system appear from the above description of said proposed method. It will be appreciated that all the embodiments described with reference to the evaluation method aspect of the present invention are applicable also for the system aspect of the present invention. That is, the system may be configured to perform any one of the method steps of the above described embodiments.

According to one embodiment of this aspect of the invention, the system further comprises a set of motorised linear stages configured to move one of the laser scanning assembly and the lower filter part in three directions with respect to the other one of the lower filter part and the laser scanning assembly. This enables evaluation of relatively large features.

Other advantageous features as well as advantages of the present invention will appear from the following description.

BRIEF DESCRIPTION OF THE DRAWINGS

The invention will in the following be further described by means of example with reference to the appended drawings, wherein FIG. 1 schematically shows a cavity filter, FIG. 2 schematically shows another cavity filter.

DETAILED DESCRIPTION OF EMBODIMENTS OF THE INVENTION

Figure 1:
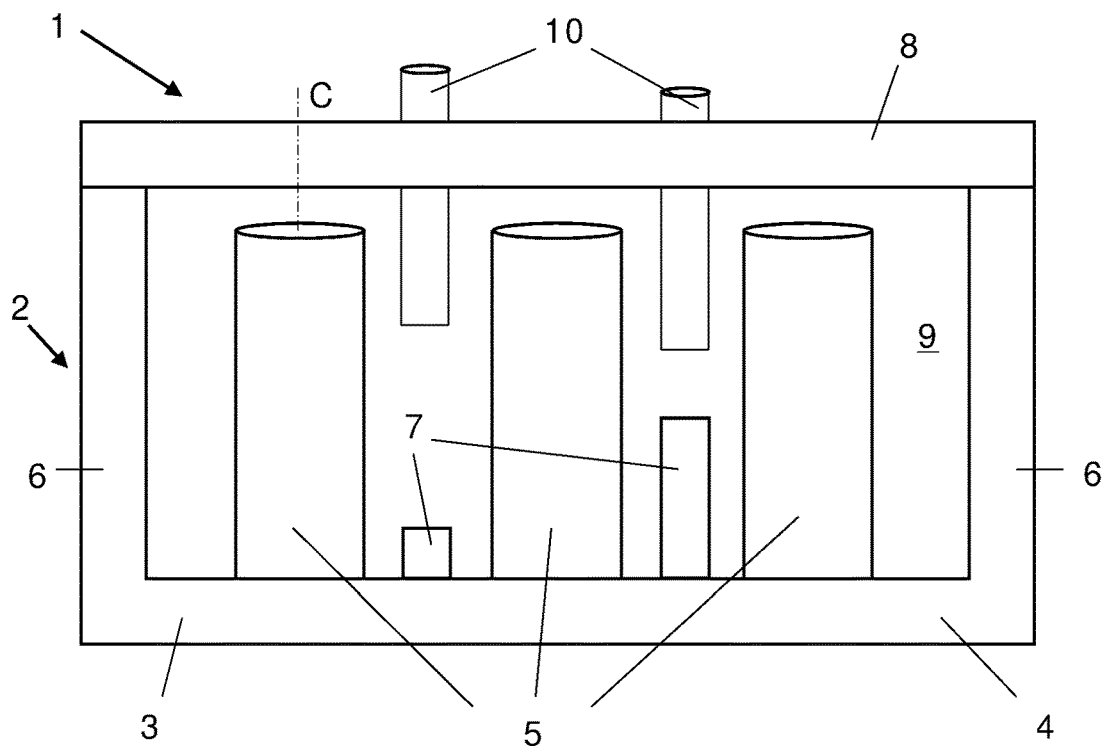

A cavity filter 1 is schematically shown in FIG. 1. The cavity filter 1 comprises a lower filter part 2 in the form of a filter body 3 with a bottom plate 4, from which cylindrical resonating elements 5 extend upward, i.e. with a longitudinal axis C oriented perpendicularly to the bottom plate 4. Wall portions in the form of outer wall portions 6 and inner wall portions 7 also extend in an upward direction from the bottom plate 4. An upper filter part 8 covers the lower filter part so that a cavity 9 is created in which the resonating elements 5 are located. Adjustable tuning elements 10, e.g. in the form of screws, are provided in the upper filter part. The resonating elements 5 are inductively coupled in series, with the inner wall portions 7 and the tuning elements 10 reducing the coupling between adjacent resonating elements 5.

Figure 2:
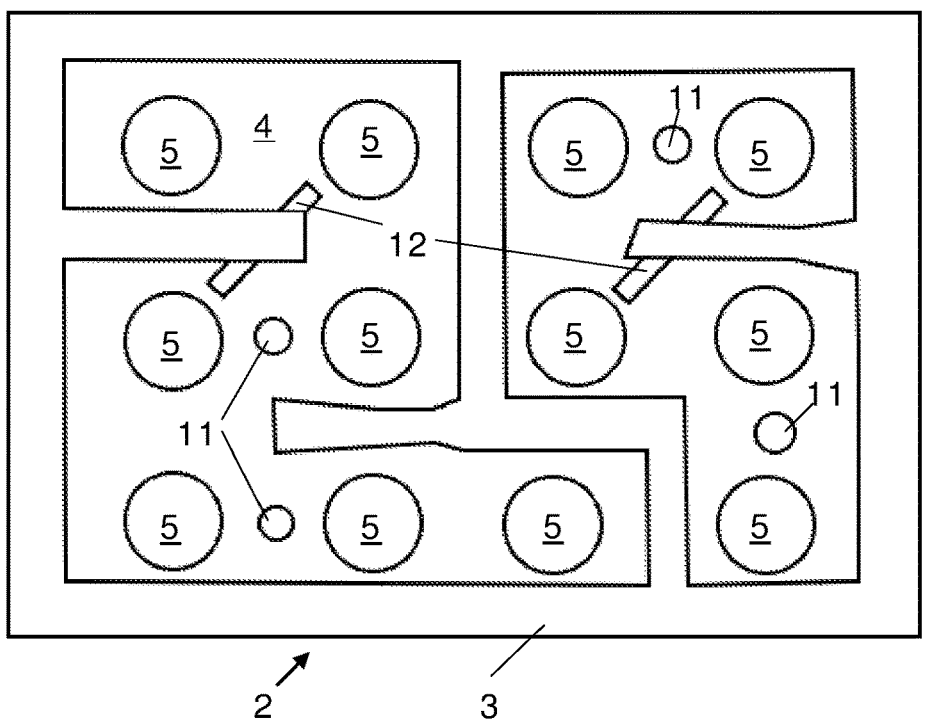

A lower filter part 2 of another cavity filter 1 is schematically shown in FIG. 2. The lower filter part 2 comprises a filter body 3 having a bottom plate 4 and resonating elements 5 extending therefrom. Decoupling elements 11 are provided between some of the adjacent resonating elements 5 coupled in series, reducing inductive coupling. A total of two cross-coupling elements 12 are provided between two respective pairs of non-adjacent resonating elements 5. Furthermore, adjustable capacitive coupling elements (not shown) can be provided on top of the resonating elements 5, so that the capacitive coupling between the resonating elements 5 and an upper filter part (not shown) can be altered by changing the distance between the capacitive coupling element and the upper filter part. The filter body 3 is provided with a conductive surface. It may thereby be manufactured from a lightweight material having poor conductivity and coated with a conductive material, such as copper or another suitable material. The filter body 3 may also be entirely manufactured from a material with high electrical conductivity.

Figure 3:
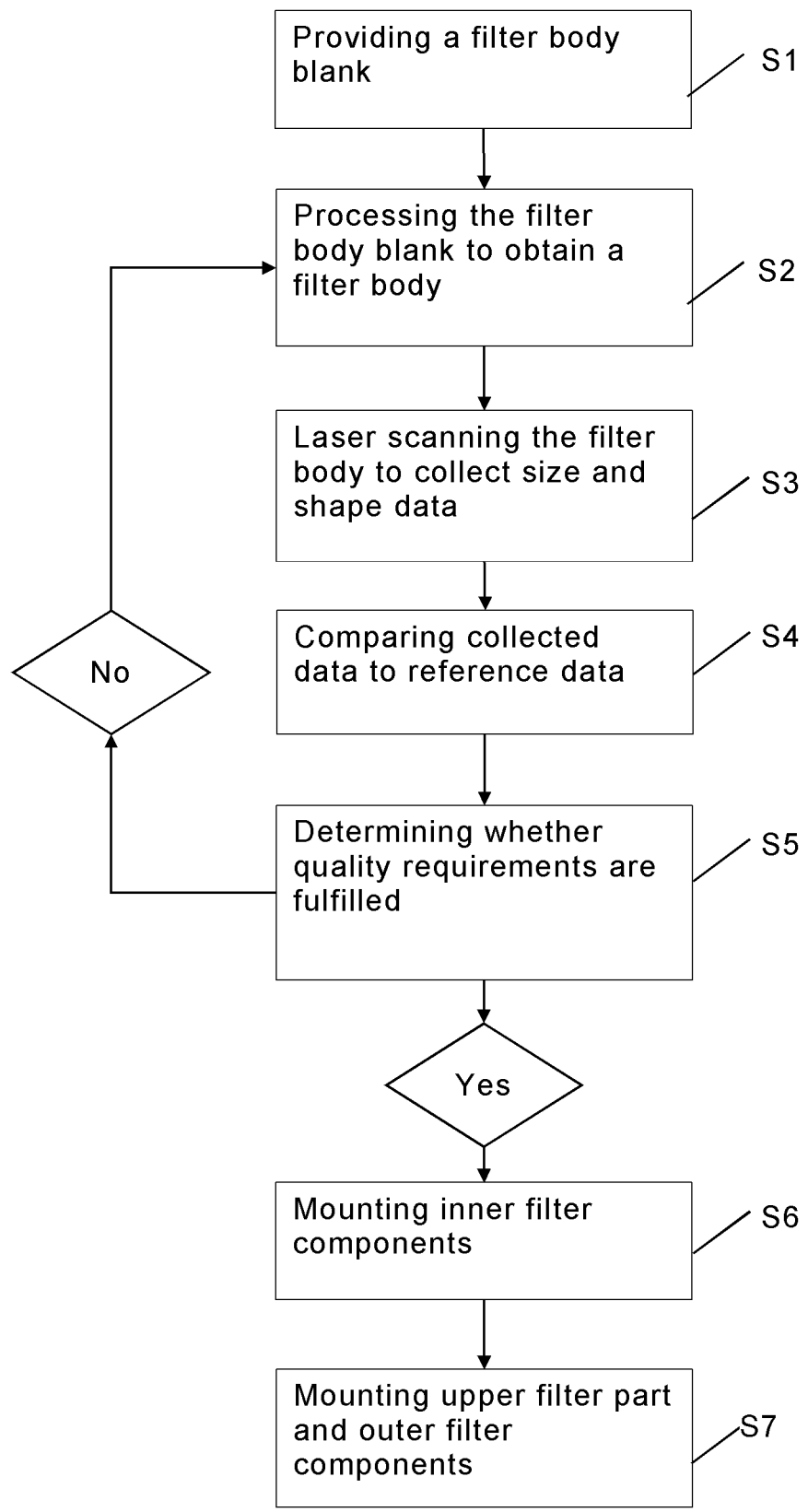
FIG. 3 is a flow chart illustrating a method according to an embodiment of the invention, and FIG. 4 schematically shows a system according to the invention.

A method for manufacturing a cavity filter as discussed above is schematically illustrated in the flow chart in FIG. 3. In a step S1, a filter body blank is provided having the rough shape of a filter body. The filter body blank may be provided by moulding a metallic material, such as aluminium, in a suitable mould. In a step S2, the filter body blank is processed, e.g. by means of milling and/or other machining operations, to obtain a filter body 3 with desired dimensions according to a specification. The filter body 3 should comprise at least a bottom plate 4, outer and inner wall portions 6, 7 and resonating elements 5, which may be formed in one piece with the bottom plate, extending therefrom. If the material used for the filter body has insufficient electrical conducting properties, a conductive coating may be provided.

In a series of steps S3-S5, it is evaluated whether the filter body 3 fulfils predetermined quality requirements, i.e. whether the filter body manufacturing quality is within a specified tolerance limit.

In step S3, the filter body 3 is scanned using a laser scanning assembly comprising one or more laser scanners. Measured laser data relating to shapes and dimensions of the filter body 3 are digitised to point cloud data in a common coordinate system. These data represent e.g. the shape and dimensions of the resonating elements 5, inner wall portions 7, and of possible decoupling elements 11. Mathematical feature recognition methods may be used to recognise features of interest within the collected data in the common coordinate system. Data which do not relate to such features may be discarded to save memory and increase the speed of the evaluation.

In step S4, the collected data are compared to reference data corresponding to the desired shape and dimensions of the filter body. The collected data that are compared are preferably data relating only to the recognised features of interest. For example, point cloud data relating to the dimensions of a resonating element 5 are compared to reference data corresponding to an ideal such resonating element. The reference data can either be data obtained from a model or from a previous scan of a filter body fulfilling the quality requirements and having an optimum design.

In step S5, based on said comparison, it is determined whether the present filter body 3 fulfils the quality requirements. This can be determined e.g. by checking if the collected data relating to certain features of the filter body 3 deviate from corresponding reference data by more than a predetermined threshold amount. If not, the quality requirements are considered fulfilled. If a deviation above the threshold amount is found, it may easily be determined which feature of the filter body 3 does not fulfil the quality requirements, and suitable actions may be taken depending on the determined deviation. Such actions may involve continued processing, discarding of the mould used to produce the filter body blank, discarding the filter body, etc.

If the quality requirements are not fulfilled (i.e. "NO"), the filter body may be returned for continued processing, in the flow chart illustrated as a return to step S2. The evaluation according to steps S3-S5 is thereafter repeated.

When the filter body 3 is found to fulfil the quality requirements (i.e. "YES"), a conductive coating, for example a metal coating such as a silver or copper coating or a ceramic coating, may be provided if not already provided before the evaluation. A set of inner filter components are in a step S6 mounted on the filter body 3 to form a lower filter part 2. The evaluation according to steps S3-S5 may thereafter be repeated, but with the entire lower filter part 2, including the filter body 3 and the components mounted thereon, being scanned and evaluated. A different set of reference data are used and it is evaluated whether the inner filter components are correctly mounted, i.e. mounted within a specified tolerance limit.

In a subsequent step S7, if the lower filter part 2 fulfils the quality requirements, an upper filter part 8 and outer filter components in the form of e.g. tuning elements 10 are mounted onto the lower filter part 2 to form a cavity filter 1. The cavity filter 1 is thereafter tuned using the tuning elements 10.

Figure 4:
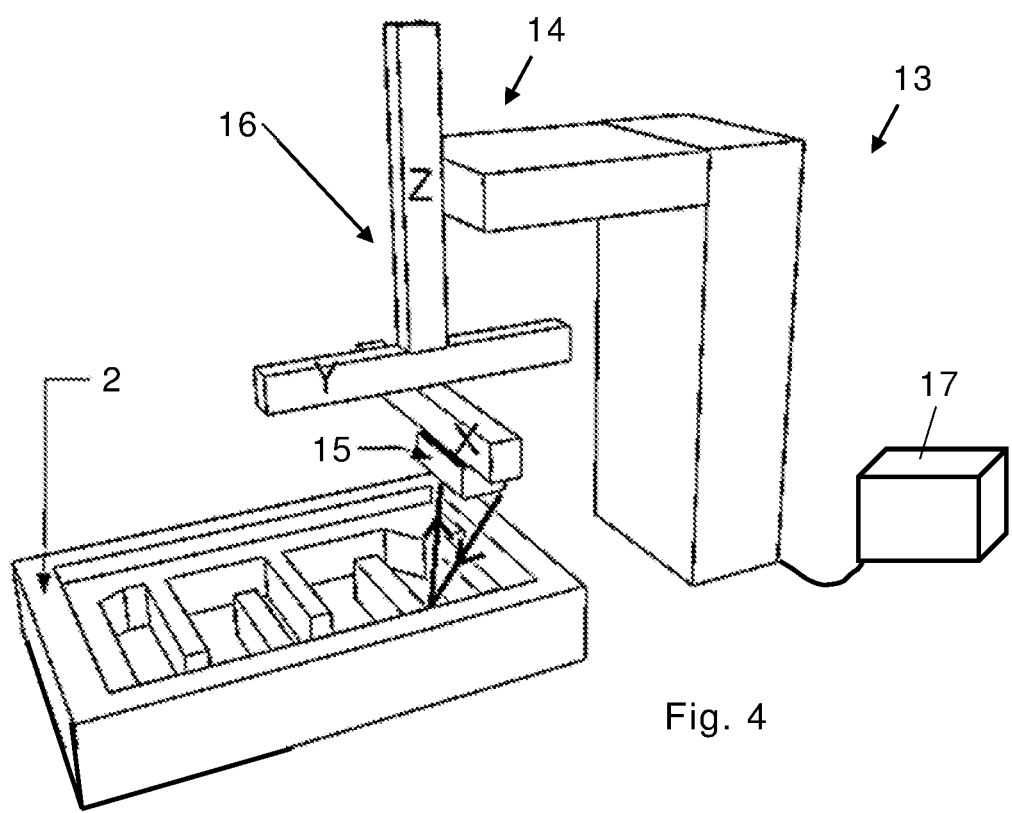

A system 13 for evaluating a lower filter part 2 of a cavity filter 1, such as a filter body 3 with or without inner components mounted thereon according to an embodiment of the invention is schematically shown in FIG. 4. The system 13 comprises a laser scanning assembly 14 configured to scan the lower filter part 2 to collect data relating to shapes and dimensions of the lower filter part 2. For this purpose, the laser scanning assembly comprises a laser source, a light-receiving element and a set of lenses comprised in a laser head 15. A set of motorised linear stages 16 configured to move the laser scanning assembly 14 in three directions X, Y, Z with respect to the lower filter part 2 is further provided. A control unit (not shown) controls the stages and the laser head. The system 13 further comprises a processing unit 17 configured to digitise the measured laser data and compare to reference data to determine whether the lower filter part fulfils predetermined quality requirements as described above with reference to FIG. 3. The system 13 also comprises means for data storage.

The invention is of course not in any way restricted to the embodiments described above, but many possibilities to modifications thereof would be apparent to a person with skill in the art without departing from the scope of the invention as defined in the appended claims.

The invention claimed is:

1. A method for evaluating a lower filter part of a cavity filter, said lower filter part including a bottom plate from which wall portions and at least one resonating element extend, comprising the steps of:
    scanning the lower filter part using a laser scanning assembly to collect data relating to shapes and dimensions of the lower filter part, and
    comparing the collected data with reference data to determine whether the lower filter part fulfils predetermined quality requirements, and including at least one of the following steps:
    the step of scanning the lower-filter part is carried out using a blue laser;
    the step of providing the laser scanning assembly comprises at least two laser sources;
    the step of scanning the lower filter part using a laser scanning assembly comprises moving one of the lower filter part and the laser scanning assembly in three directions with respect to the other one of the lower filter part and the laser scanning assembly.

2. A method for evaluating a lower filter part of a cavity filter, said lower filter part including a bottom plate from which wall portions and at least one resonating element extend, comprising the steps of:
    scanning the lower filter part using a laser scanning assembly to collect data relating to shapes and dimensions of the lower filter part, and
    comparing the collected data with reference data to determine whether the lower filter part fulfils predetermined quality requirements, wherein the step of comparing the collected data with reference data comprises identifying predefined shapes within the collected data and comparing the collected data relating to dimensions associated with said shapes with corresponding reference data, and
    including at least one of the following steps:
    the predetermined quality requirements are considered fulfilled if the collected data relating to dimensions associated with said predefined shapes do not deviate from the corresponding reference data by more than a predetermined threshold amount;
    said predefined shapes are selected so that collected data relating to an outer dimension of the at least one resonating element are compared to corresponding reference data;
    the lower filter part comprises at least two resonating elements and said predefined shapes are selected so that collected data relating to dimensions of topological features influencing coupling between the resonating elements are compared to corresponding reference data.

3. A method for manufacturing a cavity filter comprising the steps of:
    providing a filter body blank,
    processing the filter body blank to obtain a filter body having a bottom plate from which wall portions and at least one resonating element extend,
    providing an upper filter part and inner and outer filter components, assembling the cavity filter by mounting the inner filter components and the upper filter part onto the filter body and thereafter mounting the outer filter components on the filter body,
    prior to assembling the cavity filter, scanning the filter body using a laser scanning assembly to collect data relating to shapes and dimensions of the filter body, and
    comparing the collected data with reference data to determine whether the filter body fulfils predetermined quality requirements, wherein the step of assembling the cavity filter is only carried out if the filter body fulfils the predetermined quality requirements.

4. The method according to claim 3, wherein, if the quality requirements are not fulfilled, processing of the filter body blank is continued, and the steps of scanning the filter body and comparing the collected data with reference data are subsequently repeated.

5. The method according to claim 3, wherein the step of providing a filter body blank is carried out by moulding the filter body blank.

6. The method according to claim 3, wherein the step of processing the filter body blank comprises machining the filter body blank and providing it with a conductive coating.

7. The method according to claim 3, further comprising the steps of:
    prior to mounting the upper filter part, scanning the filter body with the inner filter components mounted thereon using a laser scanning assembly to verify that the inner filter components are correctly mounted, wherein the step of assembling the upper filter part, the lower filter part and the outer filter components is only carried out if the inner filter components are found to be correctly mounted.

8. A system for evaluating a lower filter part of a cavity filter, said lower filter part including a bottom plate from which wall portions and at least one resonating element extend, wherein said system comprises:
- a laser scanning assembly configured to scan the lower filter part to collect data relating to shapes and dimensions of the lower filter part,
- a processing unit configured to compare the collected data with reference data to determine whether the lower filter part fulfils predetermined quality requirements, and
- a set of motorised linear stages configured to move one of the laser scanning assembly and the lower filter part in three directions with respect to the other one of the lower filter part and the laser scanning assembly.

\* \* \* \* \*